US010922183B2

(12) United States Patent
Goebel et al.

(10) Patent No.: US 10,922,183 B2
(45) Date of Patent: Feb. 16, 2021

(54) IN-PLACE DISK UNFORMATTING

(71) Applicant: MICROSOFT CORPORATION, Redmond, WA (US)

(72) Inventors: David Allen Goebel, Vashon, WA (US); Ioan Oltean, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1092 days.

(21) Appl. No.: 14/177,810

(22) Filed: Feb. 11, 2014

(65) Prior Publication Data
US 2015/0227434 A1 Aug. 13, 2015

(51) Int. Cl.
*G06F 11/00* (2006.01)
*G06F 11/14* (2006.01)

(52) U.S. Cl.
CPC ...... *G06F 11/1448* (2013.01); *G06F 11/1435* (2013.01)

(58) Field of Classification Search
CPC ............. G06F 11/1435; G06F 11/1448; G06F 11/1458; G06F 11/1469; G06F 2201/84
USPC ................................................. 707/645, 648
See application file for complete search history.

(56) References Cited

U.S. PATENT DOCUMENTS

| | | | |
|---|---|---|---|
| 6,205,527 B1 | 3/2001 | Goshey et al. | |
| 6,289,426 B1 | 9/2001 | Maffezzoni et al. | |
| 7,409,523 B2 | 8/2008 | Pudipeddi et al. | |
| 7,814,554 B1 * | 10/2010 | Ragner | G06F 21/52 713/165 |
| 8,375,003 B1 * | 2/2013 | Afonso | G06F 11/1451 707/639 |
| 2002/0063985 A1 * | 5/2002 | Chen | G11B 20/1252 360/55 |
| 2003/0158997 A1 * | 8/2003 | Dimitri | G06F 3/0601 711/112 |

(Continued)

FOREIGN PATENT DOCUMENTS

CN 101331444 A 12/2008

OTHER PUBLICATIONS

"International Search Report and Written Opinion Issued in PCT Application No. PCT/US2015/014530", dated Sep. 16, 2015, 29 Pages.

(Continued)

*Primary Examiner* — Diedra McQuitery
(74) *Attorney, Agent, or Firm* — Shook, Hardy & Bacon, LLP

(57) ABSTRACT

Various methods and systems for in-place unformatting of disks are provided. The system includes a preparation component configured for creating a backup file on the disk and a preformatting component for using the backup file to occupy a predetermined location that defines a backup zone on the disk. The backup file is a space-holder such that the preformatting component copies primal data and file table data to the backup zone. The system further includes a formatting component for formatting the disk storing the primal data and the file table and an unformatting component that copies the primal data and file table data from the backup zone back to their original locations to unformat the disk to a preformat configuration. A safeguard component may also be implemented to ensure that the preformat component is invoked before the format component if the preparation component was executed on a volume.

20 Claims, 9 Drawing Sheets

(56) References Cited

U.S. PATENT DOCUMENTS

| | | | | |
|---|---|---|---|---|
| 2007/0064547 | A1* | 3/2007 | Kameda | G11B 7/0055 |
| | | | | 369/30.19 |
| 2007/0143563 | A1* | 6/2007 | Pudipeddi | G06F 3/0607 |
| | | | | 711/173 |
| 2007/0174664 | A1 | 7/2007 | Carmitchel et al. | |
| 2007/0220032 | A1* | 9/2007 | Kapoor | G06F 8/61 |
| 2012/0066446 | A1 | 3/2012 | Sabjan et al. | |
| 2013/0024581 | A1* | 1/2013 | Myhill | G06F 11/1464 |
| | | | | 709/230 |
| 2013/0138705 | A1* | 5/2013 | Agetsuma | G06F 3/0643 |
| | | | | 707/822 |

OTHER PUBLICATIONS

"Undelete files for FREE with UNERASER?", Published on: May 1, 2013, Available at: http://www.uneraser.com/.

Jin, et al., "Backup Metadata As Data: DPC-tolerance to Commodity File System", In Journal of Information Science and Engineering, Jul. 2011, 28 pages.

"Unformat NTFS/FAT Drive to Recover Format Lost Files", Published on: Feb. 17, 2009, Available at: http://www.easeus.com/resource/unformat-ntfs-fat-drive.htm.

"Unformat NTFS Partition", Retrieved on: Jan. 20, 2014, Available at: http://www.undoformat.com/ntfs-partition.html.

"How to Free Unformat Hard Drive and Recover Files From a Formatted Hard Drive?", Retrieved on: Jan. 20, 2014, Available at: http://www.easeus.com/resource/unformat.htm.

"First Office Action Issued in Chinese Patent Application No. 201580008174.5", dated Apr. 28, 2018, 14 Pages.

"Second Office Action Issued in Chinese Patent Application No. 201580008174.5", dated Jan. 11, 2019, 17 Pages.

"Third Office Action Issued in Chinese Patent Application No. 201580008174.5", dated Aug. 27, 2019, 6 Pages.

* cited by examiner

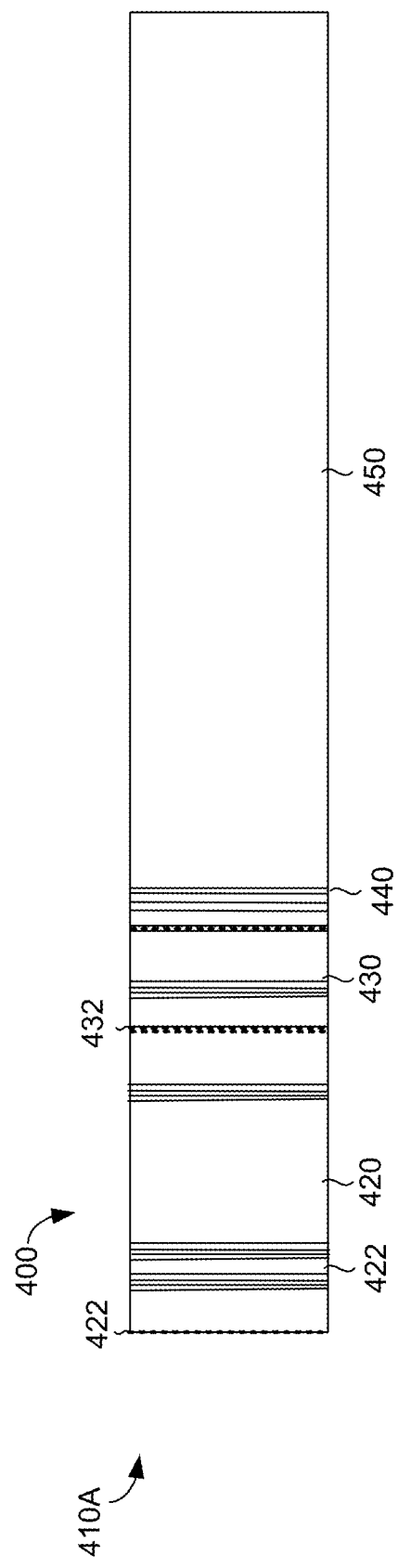

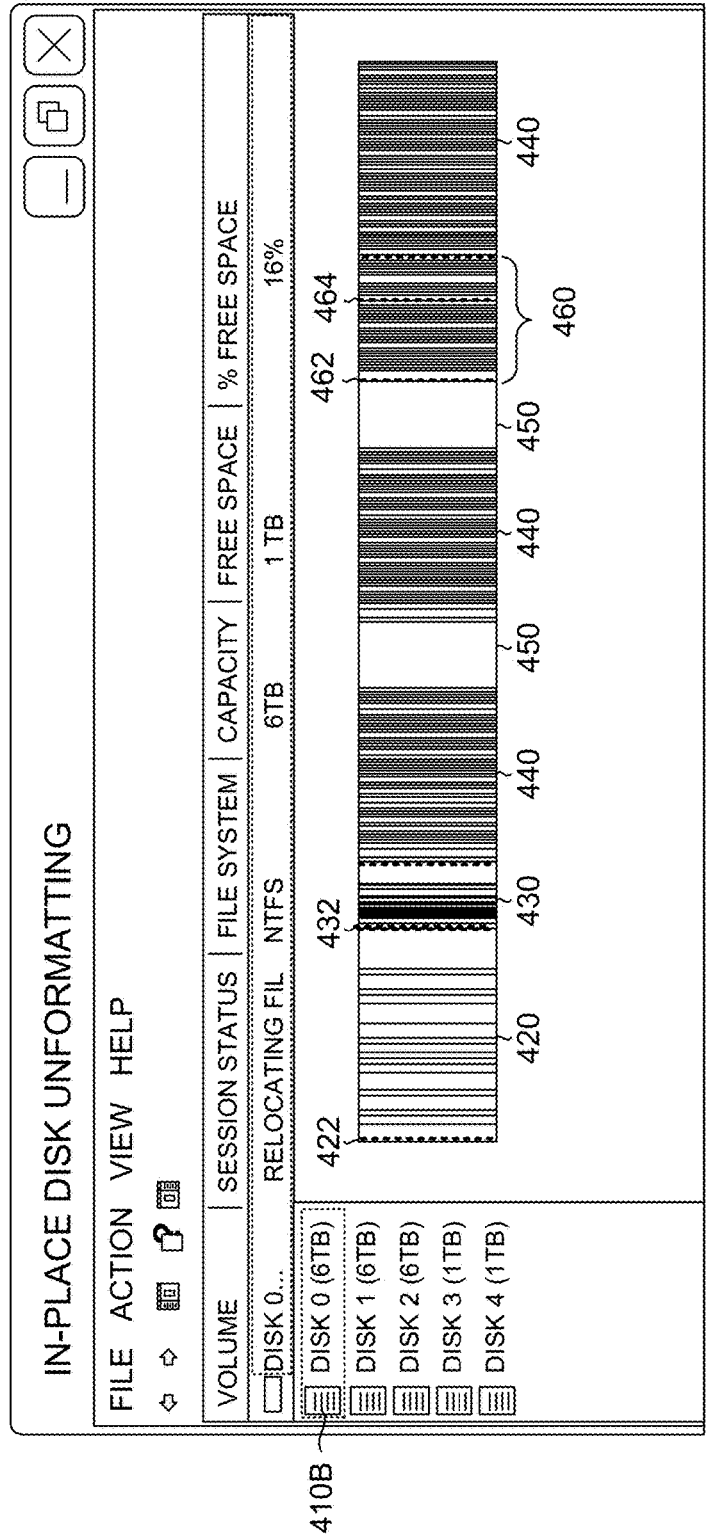

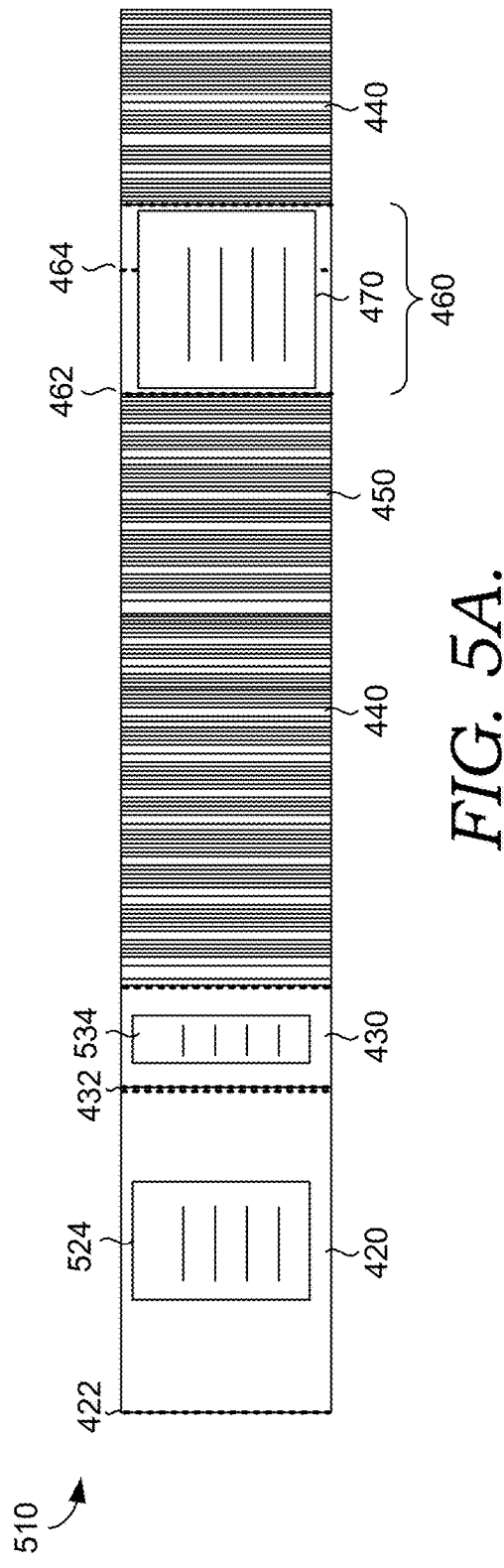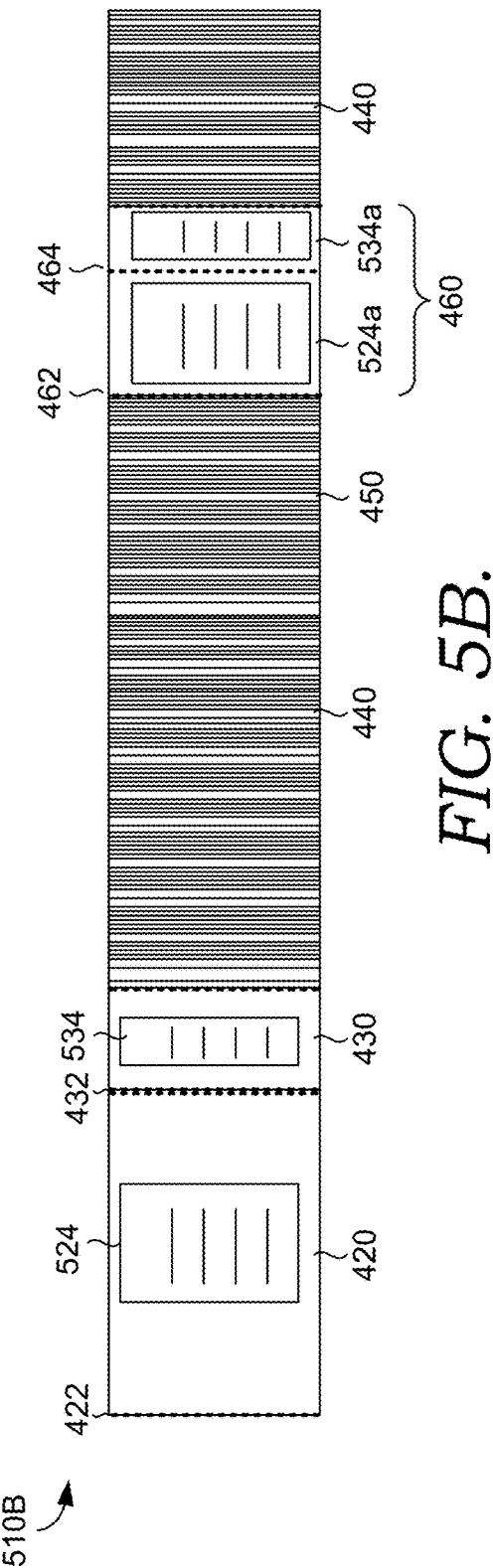

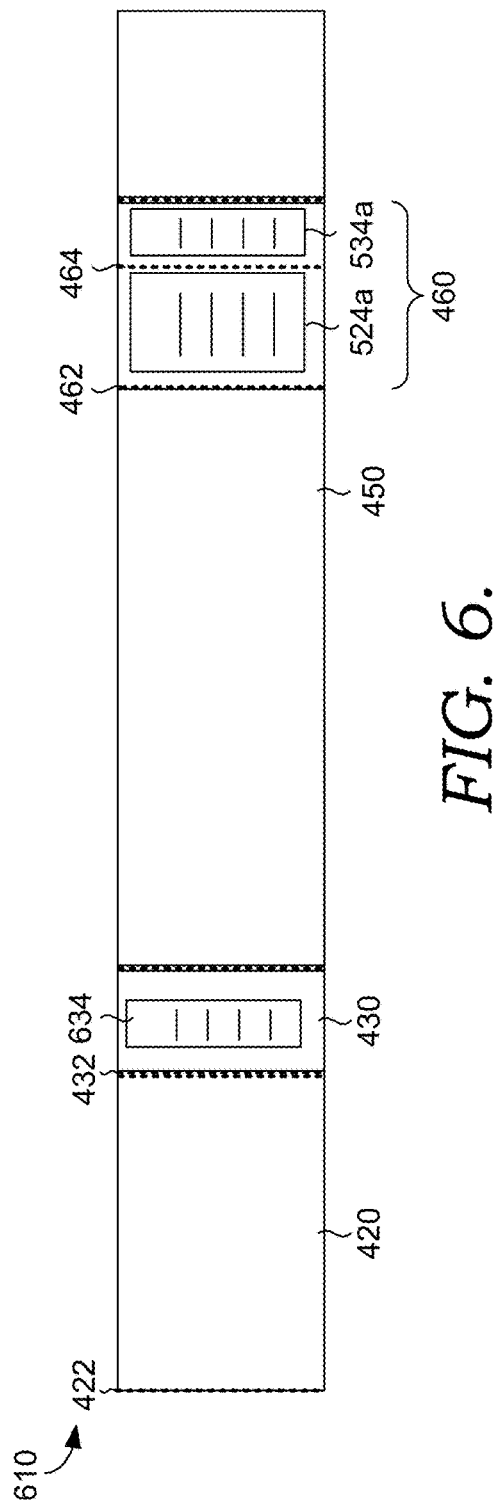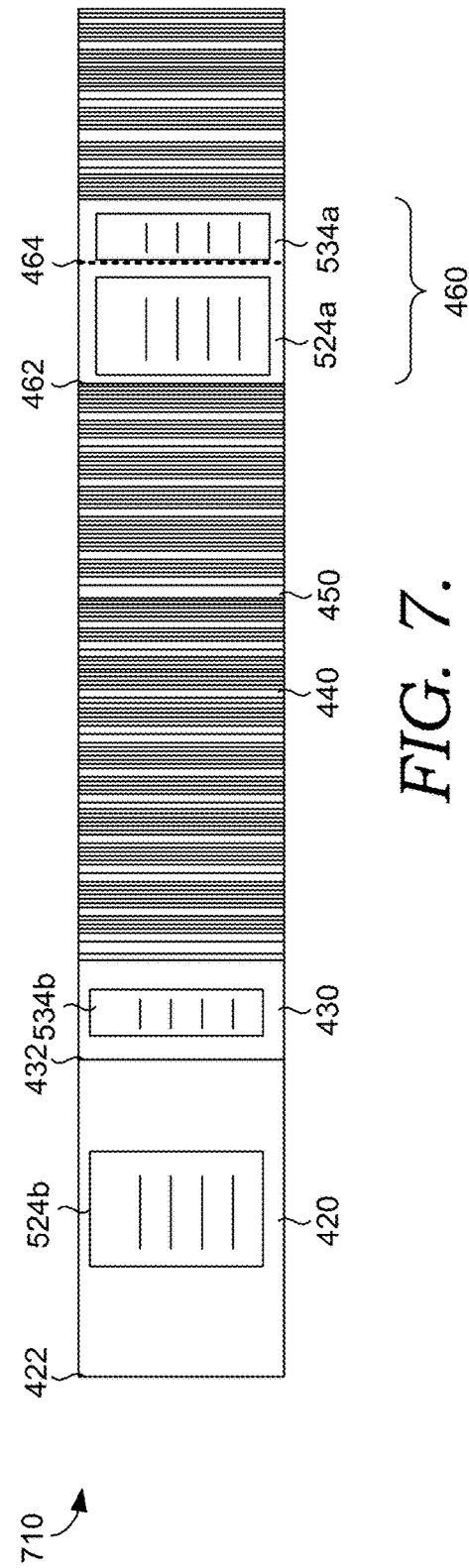

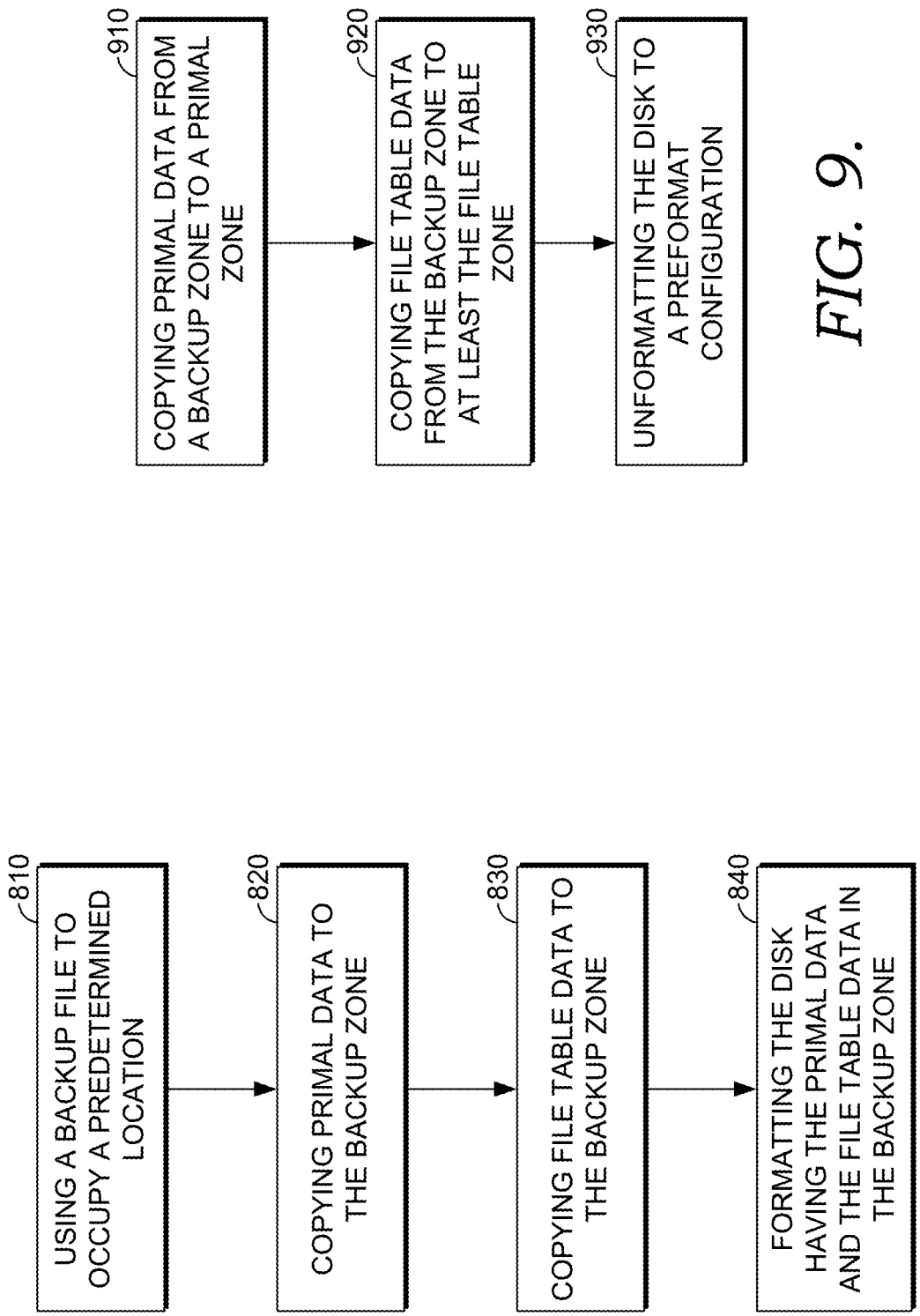

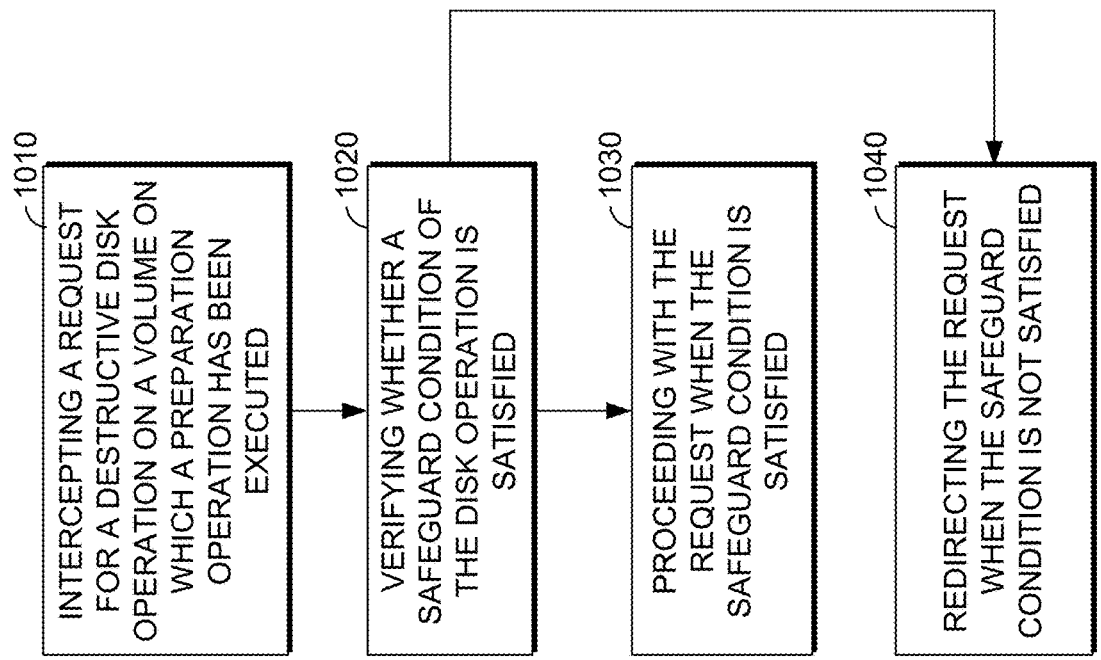

IN-PLACE DISK UNFORMATTING

BACKGROUND

Users generally perform disk formatting to prepare a data storage device for use. However, disk formatting may lead to data loss. In particular, accidental disk formatting may leave a user wanting to recover lost data from the formatted disk. Conventional methods and tools for recovering data from formatted disks rely on copying the data, usually to a separate disk, in order to recover lost data. In this regard, these methods and tools fail to provide comprehensive data recovery, especially in situations where a secondary location for copying the files is unavailable or where time is of the essence, thus necessitating a speedy recovery of the lost data. Copying the data to storage quickly provisioned elsewhere in a time critical situation also introduces security and compliance issues if the new storage and network channels have not been certified in advance.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide a distributed system for in-place unformatting of disks. The distributed system comprising a preparation component configured for creating a backup file on a disk. The distributed system further includes a preformatting component that is configured for using the backup file to occupy a predetermined location that defines a backup zone on the disk. The backup file is stored in the backup zone. The preformatting component is also configured for copying primal data from a primal zone to the backup zone. The preformatting component is further configured for copying file table data to the backup zone. The distributed system further includes a formatting component. The formatting component is configured for formatting the disk having the primal data and the file table data in the backup zone. The distributed system further comprises an unformatting component. The unformatting component is configured for copying the primal data from the backup zone to the primal zone. The unformatting component is also configured for copying the file table data to at least a file table zone. The unformatting component is further configured for unformatting the disk to a preformat configuration.

BRIEF DESCRIPTION OF THE DRAWINGS

The present invention is described in detail below with reference to the attached drawing figures, wherein:

FIGS. 4A, 4B, and 4C are schematic diagrams showing exemplary disk volumes and an exemplary graphical user interface for in-place unformatting disks, in accordance with embodiments of the present invention;

FIGS. 5A and 5B are schematic diagrams showing a method for in-place unformatting disks, in accordance with embodiments of the present invention;

FIG. 6 is a schematic diagram showing a method for in-place unformatting disks, in accordance with embodiments of the present invention;

FIG. 7 is a schematic diagram showing a method for in-place unformatting disks, in accordance with embodiments of the present invention;

FIG. 8 is a flow diagram showing a method for in-place unformatting disks, in accordance with embodiments of the present invention;

FIG. 9 is a flow diagram showing a method for in-place unformatting disks, in accordance with embodiments of the present invention; and FIG. 10 is a flow diagram showing a method for safeguarding in-place unformatting disks, in accordance with embodiments of the present invention.

DETAILED DESCRIPTION

Figure 1:
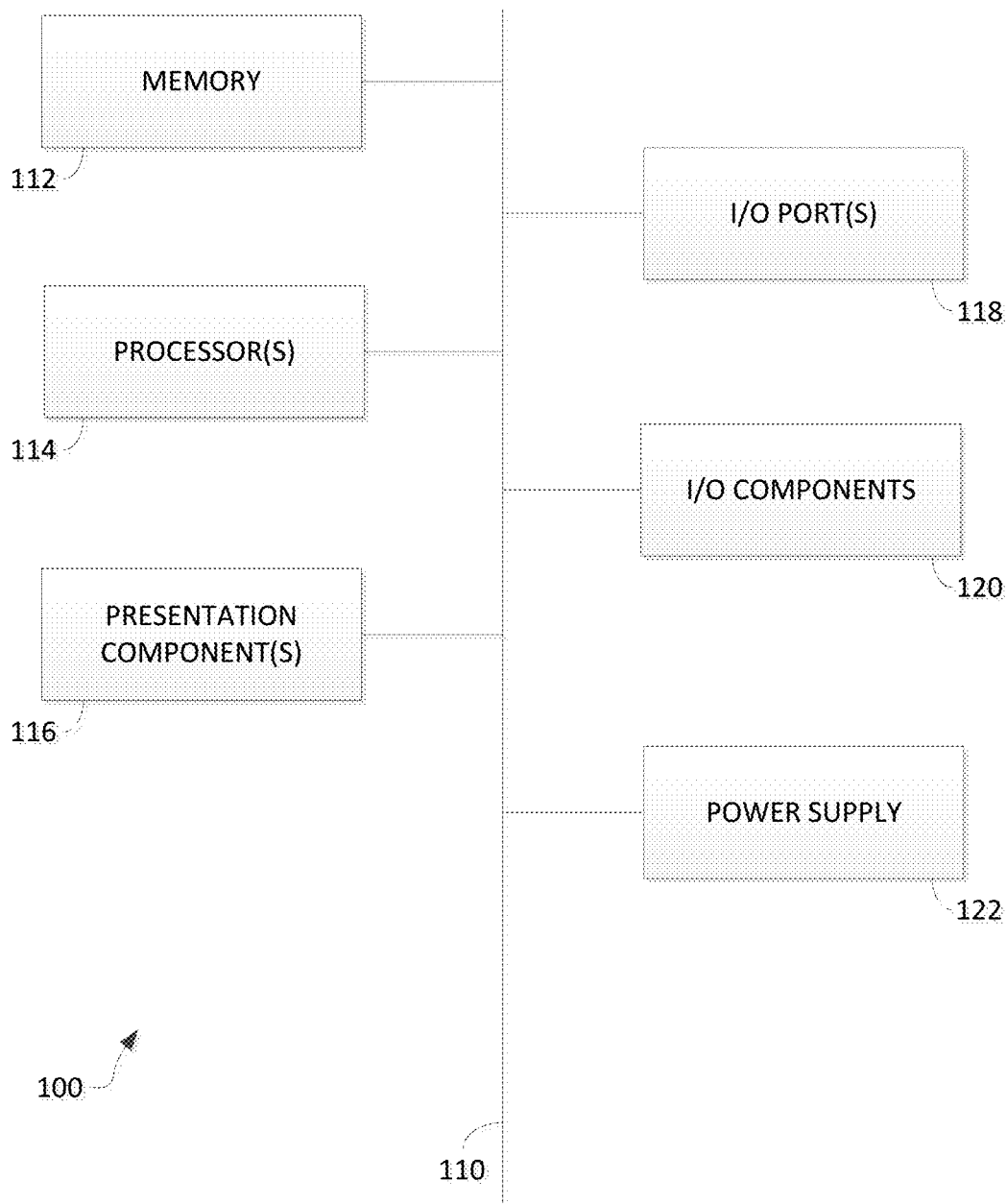
FIG. 1 is a block diagram of an exemplary computing environment suitable for use in implementing embodiments of the present invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

For purposes of a detailed discussion below, embodiments of the present invention are described with reference to a cloud computing platform disk storage; however the cloud computing platform disk storage is merely exemplary and it is contemplated that the techniques described may be extended to other implementation contexts and storage devices that necessitate in-place unformatting.

A disk may generally refer to a block addressable storage device or virtual storage device backed by a physical disk, collection of disks, storage area network, or other technology capable of storing information. A disk may be distinguished from a volume in that a volume generally refers to a block addressable area of storage presented to a file system and storage device backed by a physical disk, collection of disks, storage area network, or other technology capable of storing information. In this regard, disks may be configured with file systems. A file system on a disk may be used to control how information is stored and retrieved. Exemplary file systems include MICROSOFT'S New Technology File System (NTFS) and File Allocation Table (FAT). A file system functions to record start and stop locations of portions of data. In particular, data may be separated into individual files, and each individual file given a name so that information is separate and easily identifiable. NTFS data on a disk may be in individual NTFS file volumes, with a volume having a volume directory of files. NTFS may further support journaling in that NTFS records metadata changes to the volume of the disk. Metadata may include, file name, creation data, access permissions and size. In an NTFS volume, directory, journaling data and metadata may be stored in a Master File Table (MFT). The MFT preserves the structure of information on the disk, showing how each of the NTFS files is stored on an NTFS volume on the disk.

When a disk is formatted as a file system volume, (e.g., an NTFS volume), the operating system creates an MFT. Disk formatting generally refers to a process of preparing a data storage device for use. The MFT may be created with a particular MFT starting point (e.g., 3 GB) on the disk. The operating system will normally reserve a percentage of the available capacity (MFT Zone) of the volume for the MFT (e.g., 1 GB) in a single contiguous space. The MFT zone may be calculated and reserved by the system when the system mounts the NTFS volume, and the MFT zone may also be based on the volume size. As files are added to an NTFS volume, more entries are added to the MFT and the MFT increases in size. Eventually, the MFT may become too big for the MFT zone and needs to expand. As such, the MFT may become fragmented, with other additional MFT entries created in other parts of the disk. The MFT points to the location on the disk of the next MFT extension. The MFT may resemble a single linked-file spread across the disk with each portion of the MFT containing information about a location on the disk to locate the next portion.

A formatting process further includes freeing disk space for use by other data. When a disk that already includes data is formatted, the operating system may basically create a new MFT, mark the previous data as free space, and allow overwriting previous data on the disk. Overwriting the data usually begins at the start of the disk volume, and the new data locations and metadata are recorded in the new MFT. In this regard, formatting may exclude actually erasing data (e.g., unconditional formatting) in that erasing data comprises overwriting each block of data on the disk. A formatting process may also include performing a variety of different types of destructive operations at the volume or disk levels. For example, an operation may wipe out a partition table on a disk, leaving the disk completely raw.

Although users generally perform disk formatting to prepare a data storage device for use, accidental disk formatting may leave a user wanting to recover lost data from the formatted disk. Data recovery may generally refer to the process of salvaging data from a disk. Unformatting, in particular, generally refers to restoring a disk erased by formatting. Data recovery may take advantage of the formatting process not actually erasing files residing on a disk. Because the formatting process may not be an unconditional format, and may at times merely create a new MFT zone at a defined MFT start location, the data remains intact. As such, data recovery tools may be used to either recover data or restore the disk completely.

Conventional methods and tools for recovering formatted disks rely on copying the data, usually to a separate disk, in order to recover lost data. These methods and tools fail to provide comprehensive data recovery especially in situations where a secondary location for copying the files is unavailable and/or where time is of the essence necessitating a speedy recovery of the lost data. Copying the data to storage quickly provisioned elsewhere in a time critical situation also introduces security and compliance issues if the new storage and network channels have not been certified in advance. With cloud computing platforms in particular, components therein operate at a massive scale with time constraints to support the several different types of applications and services. It may be impractical to copy large amounts of data in a recovery process which may require time and additional resources including storage disks and bandwidth for files to be copied to different storage disks during a recovery process.

Generally, embodiments of the present invention provide a simple and efficient in-place disk unformatting and recovery system, and methods for in-place unformatting and recovering data on disks. In-place unformatting may provide the capability to restore a previously formatted disk in-place without having to relocate files to another disk, as such, limiting costs associated with additional storage resources, bandwidth, and time constraints. Consequently, data on a cloud computing platform and other types of data on a disks may be protected from accidental formatting.

In operation, two types of data of a volume are backed-up. File table data and primal data. A file table generally refers to a file system (e.g., NTFS) structure that defines the files on a volume. A file table may include information about where data is located, and the associated metadata. File table data may be located in a file table zone, but also in other locations in a volume of a disk. An exemplary file table is a Master File Table (MFT) of an NTFS volume. A primal zone generally refers to areas of the volume that the file system will allocate first as files are written to a freshly formatted volume. In particular, an NTFS will allocate files to the first 3 GB. Accordingly data in the primal zone is referred to herein as primal data. An NTFS volume may be nearly rebuilt from just the MFT; however, additional metadata that is located in the first 3 GB, as part of the primal data, may be needed. As such, backing up the primal data ensures that the metadata is also saved. With a backup of both the file table data and the primal data, an unformat operation may be performed without running a repair command (e.g., chkdsk) to rebuild the volume. The backup of the file table data and the primal data are left on the same physical disk of the volume, which further makes unformatting occur directly and quickly from the disk itself.

Embodiments of the present invention may be performed based on receiving a service request to create a backup file to support unformatting on a disk. The backup file may be created at the root of directory of the volume and marked as read-only to help protect the backup file against accidental deletion. The backup file may serve both as a marker for a predetermined location that defines a backup zone and also provides storage or act as a space-holder for backing up the file table data and primal data of the volume. The predetermined location for the backup file may be a physical hardcoded location (e.g., 900 GB–900 LL*1024*1024*1024 bytes) on the disk. Having the 900 GB-9004 GB backup zone be relative to the disk ensures that a header at this location can be found regardless of where an operating system starts the volume on the disk. For example, an instance where a new volume is created at a different disk offset from the backed up volume. The physical hardcoded location may be described as being disk relative.

The primal data and the file table data may be expected to be less than a predetermined size (e.g., 4 GB–3 GB primal data and ~1 GB file table data). The 1 GB limit may be a specific implementation parameter not intended to restrict embodiments of the present invention. A volume with the 1

GB file table limit may still store around a million files. It is contemplated that implementation may backup the entire file table without any restriction on the size, and as such configure a backup file that would accommodate the primal data and file table data to perform operations of the present invention.

A backup file may be created on volumes that range from relatively empty to volumes that are almost full. In an optimized implementation, where the volume is relatively empty and the backup zone is available to create and defragment the backup file to the backup zone, the backup file is created to match the size and location of the backup zone. In an alternate implementation, the backup file may be created with double the size of the backup zone. A backup file can be created with double the allocation when working with volumes that are almost full. When the volume is almost full, the backup file may be created on the disk but stored as several different fragments scattered at different locations of the volume. The predetermined location (e.g., 900-904 GB) that defines the backup zone may also be filled with other fragments of data. Because the backup file has to be a single contiguous extent in the backup zone, a mechanism is configured to support defragmenting files on an almost full volume to make the backup file contiguous. This mechanism involves creating the backup file with double the allocation that is eventually needed (e.g., 8 GB instead of 4 GB); thus, the backup file may be truncated from a first size, 8 GB, to a second size, 4 GB, creating free clusters to support defragmenting data file extents from the backup zone. The 8 GB backup file effectively reserves, in advance, free clusters that may be needed to vacate the backup zone.

With the backup file occupying the backup zone, the file table data and the primal data, may be copied to the backup zone. In particular, the file table data includes mapping information for the file table such that the file table data and mapping information may be used to restore the file table to correct locations on the volume when the disk is unformatted. In this regard, a copy of the file table data is consolidated from different locations in the volume at a predetermined location (e.g., 903 GB) in the backup zone. In one embodiment, the backup file is not overwritten using conventional file writing APIs, but rather primal data and the file table data are directly written to the volume clusters that are allocated to the backup file. In this regard, writing the primal data and file table data to the backup zone bypasses the file system. Further, the predetermined locations and sizes of the file table, and primal data as described herein are merely for an exemplary implementation and not intended to restrict the scope of embodiments of the present invention. Other predetermined locations and sizes are contemplated with embodiments of the present invention.

Upon performing the above-described steps on a disk, the disk may be formatted. Formatting the disk may include initializing and writing out a new file system metadata to a volume of the disk. Formatting a disk may further include destructive operations at the volume or disk level. For example, an operation may wipe out a partition table on a disk, leaving the disk completely raw. Any variations or combinations of other types of destructive operations of the formatting component are contemplated within the scope of the present invention. In the event that it is later determined that the format operation was accidental, a properly preformatted disk that was formatted after backing up the file table data and primal data, may be recovered using the data backed up data in the backup zone of the disk. The primal data and the file table data can basically be copied back to preformat locations to restore the disk to a preformat configuration.

Accordingly, in a first aspect of the present invention, a distributed system for in-place unformatting of disks is provided. The distributed system comprises a preparation component configured for creating a backup file. The distributed system further comprises a preformatting component. The preformatting component is configured for using the backup file to occupy a predetermined location that defines a backup zone on the disk. The backup file is stored in the backup zone. The preformatting component is further configured for copying primal data from a primal zone to the backup zone. The preformatting component is also configured for copying file table data to the backup zone. The distributed system further comprises a formatting component configured for formatting the disk storing the primal data and the file table data. The distributed system also comprises an unformatting component. The unformatting component is configured for copying the primal data from the backup zone to the primal zone. The unformatting component is also configured for copying the file table data to at least a file table zone. The unformatting component is further configured for unformatting the disk to a preformat configuration.

In a second aspect of the present invention, one or more computer storage media having computer-executable instructions embodied thereon that, when executed, cause a computing device to perform a method of formatting disks for in-place unformatting, are provided. The method includes using a backup file to occupy a predetermined location that defines a backup zone on the disk. The backup file is stored in the backup zone. The method also includes copying primal data from a primal zone to the backup zone. The method further includes copying file table data to the backup zone. The method includes formatting the disk having the primal data and the file table data in the backup zone.

In a third aspect of the present invention, a computer implemented method for in-place unformatting disks, suitable for use in a distributed computing environment utilizing a processor and a memory, is provided. The method includes copying primal data from a backup zone of a disk to a primal zone of the disk. The primal data is occupying a first portion of a predetermined location that defines the backup zone on the disk. The method also includes copying the file table data from the backup zone to at least a file table zone. The file table data occupying a second portion of the predetermined location. The predetermined location is configured using a backup file. The method further includes unformatting the disk to a preformat configuration.

In yet another embodiment of the present invention, a computer implemented method for in-place unformatting disks, suitable for use in a distributed computing environment utilizing a processor and a memory, is provided. The method includes intercepting a request for a destructive disk operation such as a format request on a volume on which a preparation component has executed. The method also includes verifying whether a safeguard condition of the disk operation is satisfied. A critical safeguard being that the preformat component was invoked before the format component if a preparation component executed on a volume, i.e., if a backup file exists. The method further includes proceeding with the request when the safeguard condition is satisfied. The method also includes redirecting the request when the safeguard condition is not satisfied.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
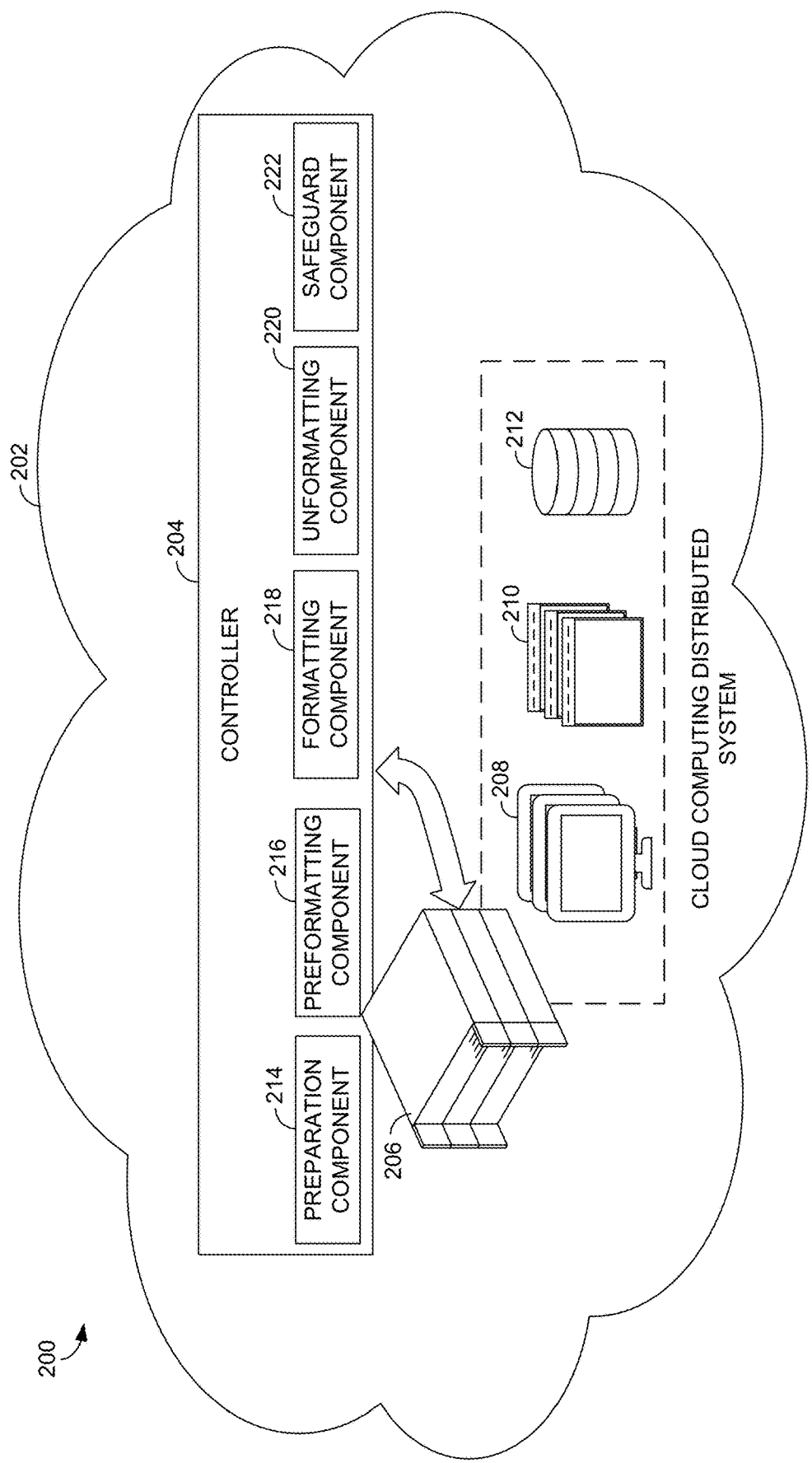
FIG. 2 is a block diagram of an exemplary cloud computing distributed system in which embodiments of the invention may be employed.

With reference to FIG. 2, a block diagram 200 depicting an exemplary cloud computing distributed system 202 suitable for use in embodiments of the invention is described. Generally, the cloud computing distributed system 200 illustrates an environment for in-place unformatting of a storage device (e.g., disk) using a backup file as a space-holder at a specific location on the disk. In particular, a cloud computing distributed system storage device and other types of storage devices may be unformatted using a backup file as a space-holder. Typically, a cloud computing platform acts to store data or run service applications in a distributed manner. A distributed system cloud computing platform may span across wide geographic locations, including countries and continents. The cloud computing platform can be a public cloud that provides different types of services including compute services (e.g., virtual machines, web sites, cloud services, and mobile services), data services (e.g., storage, SQL databases, SQL reporting, tables, backup, recovery, and Blobs), networking services (e.g., virtual network, traffic manager, data transfer) and application services (e.g., media services, service bus, notification hubs, and multi-factor authentication). A tenant may have contractual agreements with a host for one or more service-applications and service level agreements and policies for supporting the tenant infrastructure. The cloud computing distributed system 202 includes the controller 204 and the collective referred herein to as services and applications platform (e.g., node 206, VM 208, application 210, and database 212 instances). The phrase "application" or "service" as used herein broadly refers to any software, or portions of software, that runs on top of, or accesses storage locations within, the datacenter. In one embodiment, one or more of the endpoints may represent the portions of software, component programs, or instances of roles that participate in the service application.

Generally, the controller 204 manages all the resources in the cloud computing distributed system 202. The controller 204 is configured to deploy, manage, monitor, and maintain services and applications. For example, the controller 204 may manage computation entities called nodes (e.g., node 206) that operate as clients and/or servers. Several different types of nodes form a network of computing devices in the cloud computing platforms.

Node 206 may comprise and rely on physical storage devices (e.g., disk) for storing information that facilitate running services and applications. In embodiments of the present invention, the controller 204 may be configured to enumerate disks on a node in the cloud computing distributed system 202. Disks may be enumerated through a user interface to support interaction between, for example, an administrator and the disks for initiating requests for operations on the disks. Different classes of user interfaces (e.g., command line, graphical user interface and touch interfaces) are contemplated with embodiments of the present invention for communicating operations of the disks on the node. Operations may include general support functions of disks (e.g., maintenance operations) on the cloud computing distributed system 202. Operations may further include service requests, for example, preparation operations, preformatting operations, formatting operations or unformatting operations on disks.

Operations may be facilitated by a service running at least in part on the controller 204. For example, a storage service of the controller 204 may be utilized in configuring, monitoring, maintaining, and scaling storage. The storage service may also be used, for example by an administrator, to execute preparing, preformatting, formatting and unformatting operations on disks associated with nodes in the cloud computing distributed system. It is contemplated that other services may in the alternative, or in addition, be used to implement features of the present invention. In embodiments, an agent (not shown) on node 206 may be configured to act as an intermediary in communications between the controller 204 and service and application components. The controller 204 may work with several different components for performing a method of in-place unformatting according to embodiments of the present invention. The cloud computing distributed system 202 includes components, among other components not shown, a preparation component 214, a preformatting component 216, a formatting component 218, an unformatting component 220, and a safeguard component 222.

It should be understood that this and other arrangements described herein are set forth only as examples. Other arrangements and components (e.g., machines, interfaces, functions, orders, and groupings of functions, etc.) can be used in addition to or instead of those shown, and some components may be omitted altogether. Further, many of the components described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. In embodiments, one or more of the components may be part of an operating system supporting the disk, while the other components are implemented as add-ons. For example, an operating system may inherently support a format component 218 that performs the features of the format component as described herein, while a preparation component 214, a preformatting component 216, an unformatting component 220 and a safeguard component 222 may be implemented as part of the cloud computing distributed system code different from the operation system of a particular disk. Other variations and combinations of locations of individual components are contemplated within the scope of the present invention.

The preparation component 214 may be configured to facilitate a preparation phase. The preparation phase includes performing preparation operations that comprise creating a backup file on a disk. The preparation component 214 may create the backup file and save the file at a predetermined location (e.g., 900 GB–900 LL*1024*1024*1024 bytes) on the disk. The predetermined location defines a backup zone (e.g., 900 GB-904 GB) for storing the backup file. In embodiments, the backup file may be created in a root directory of the volume. The backup file may optionally be created as a read-only file.

The predetermined location may be a physical hardcoded location on the disk. The physical hardcoded location is relative to a starting point on the disk not the volume. In this regard, a header created at the physical hardcoded location may be readily accessible at the location no matter where an operating system starts a volume of the disk. A header may include additional information about the backup volume that supports the implementation of checks and safeguard discussed herein. The physical hardcoded location also provides the ability to determine the preformat backup state of a volume regardless of where the volume starts on the disk. In addition, the physical hardcoded location may be defined at the predetermined location that is at least less than a nominal disk capacity of disks configured in the cloud computing distributed system 202. A physical hardcoded location is configured to be less than a nominal disk capacity (i.e., smallest disk capacity) because the location may be configured to be as high as possible on the volume but still less than the smallest disk in a cloud computing distributed system. This configuration may protect against writing to the backup area on otherwise completely empty disks and may further provide for recovery if a volume is created at a different offset on the disk.

The backup file may be created as a space-holder for primal data and file table data in the predetermined location that defines a backup zone. The primal data and file table data may be of an expected size (e.g., 4G), as such, the backup file may be created to accommodate an anticipated size. Creating the backup file having an expected size may occur in an optimal scenario where the preparation component 214 is presented with a nearly empty volume where the predetermined location (900 GB-904 GB) is available to create and defragment the backup file to the backup zone. However, in a scenario where the predetermined location is not available to create and defragment the backup file to the backup zone, because the volume contains too much data, the backup file can be created with double the allocation that is eventually needed (e.g., 8 GB instead of 4 GB). Thus, the backup file may be truncated from a first size, 8 GB, to a second size, 4 GB, creating free clusters to support defragmenting data files in the backup zone where the backup file should be stored contiguously.

The preformatting component 216 may be configured to facilitate a preformatting phase. The preformatting phase includes performing preformatting operations that comprise using the backup file to occupy a predetermined location that defines a backup zone. In particular, the backup file may be positioned contiguously on the disk in the backup zone for an end state of the backup zone. Positioning the backup file contiguously may be facilitated by defragmenting Application Programming Interfaces (API). The file relocation APIs typically used to defragment files may be used to relocate files in embodiments of the present invention. In particular, the backup file may be relocated and consolidated in the backup zone. In a first scenario, where the volume is relatively empty, the backup file may be created having a first size that matches the capacity of the backup zone (e.g., 4 GB) to act as a space-holder for the primal data and the file table data. In this regard, the preformatting component positions the backup file contiguously in the backup zone. In a second scenario, where the volume is full enough that the backup zone is not completely available, the backup file may be created having a second size (e.g., 8 GB) that is twice the capacity of the backup zone. In this regard, the preformatting component 214 first truncates the backup file to 4 GB, thereby adding 4 GB of free clusters on the volume and uses these and other free clusters on the volume as the destination for extents of files in the backup zone. Finally when the backup zone is completely vacated the now 4 GB backup file can be defragged to the backup zone.

The preformatting operations further include copying primal data from a primal zone to the backup zone, and copying file table data to backup zone. The primal zone (e.g., 3 GB offset from the start of the volume) includes areas of the volume that the file system will usually allocate first as files are written to a freshly formatted volume. The primal data includes additional metadata that is located in the primal zone that may be needed, in addition to the file table, to rebuild the volume. The primal data may include both non-file table files (e.g., user data) and file table files (e.g., metadata). As such, backing up the primal data ensures that the metadata is also saved. The primal data may be stored in a first portion of the backup zone (e.g., 900 GB-903 GB), where the preformatting component 216 may overwrite at least a first portion of the backup file in the backup zone.

The file table data is also copied to the backup zone. The file table data comprises data in the file table zone. The file table may further include fragmented portions of the file table in different locations on the volume. The file table data also includes mapping information for the file table such that the file table data and mapping information may be used to restore the file table to correct locations on the volume when the disk is unformatted. In this regard, the preformatting component 216 may be configured to copy file table data from different locations in the volume and consolidate the file table data in the backup zone (e.g., 903 GB). The preformatting component 216 may overwrite at least a second portion of the backup file in the backup zone. In an embodiment, the primal data and file table data may be copied to the backup zone by directly writing to the volume clusters allocated to the backup file, as such, bypassing the file system.

It is further contemplated the preformat component 216 may perform some preformat checking prior to preformatting the disk. Preformat checking may protect against human error that may inadvertently cause the loss of data. A preformat check may be performed and when a condition is not verified, the backup may be failed or other recourse action performed. By way of example, a check may prevent the performance of consecutive backup. In particular, consecutive backups may be prevented within a predefined window (e.g., 24 hours). Such preformat checking may exist because a full volume that is backed up and formatted, which is then for a second time backed up and formatted, would overwrite the data that was previously recoverable using a backup zone. The data written to the backup zone the second time would merely represent an empty volume.

Another exemplary check may confirm whether the backup file is at the predetermined location (e.g., 900 GB). If the backup file is not at the predetermined location, a recourse action may simply be move the backup file to the predetermined location, while moving other files out of the predetermined location. Manual overrides are provided at the API level should an unforeseen unique situation arise requiring a preformat to proceed in a situation that is normally blocked.

In addition, a backup may be failed based on not satisfying one or more of the following additional conditions that include: the volume does not contain the backup zone (e.g., 900 GB-904 GB); the volume does not start at the expected starting point (e.g., 1 MB or 129 MB); the file table (e.g., $MFT) does not start at the expected location (e.g., 3 GB); a backup header is present at the predetermined location (e.g., 900 GB) and the correct version but malformed; the volume has fewer than a low threshold number of records (e.g., 256 file records) and is more than a high threshold free capacity (e.g., 99% free); the backup file is less the anticipated size (e.g., 4 GB). Any other variations and combinations of other types of preformat checks are contemplated within the scope of the present invention.

The formatting component 218 may be configured to facilitate a formatting phase. The formatting phase includes performing formatting operations that comprise formatting the disk storing the primal data and the file table data. The formatting component 218 may configure a file system (e.g., MICROSOFT'S NTFS) on the disk. The file system functions to record start and stop locations of portions of data. The data on the disk may be in individual file volumes with a volume having a volume directory of files. The directory, journaling, and file metadata (e.g., file name, creation data, access permissions and size) can be stored in a file table that preserves the structure of information of the disk.

Formatting operations may further comprise reserving a file table zone on the disk and configuring a new file table. The file table zone may be created at a predetermined starting point on the volume. The formatting component 218 may calculate and reserve the file table-zone when the volume of the disk is mounted. Reserving the file table zone may trigger the creation of the file table which is stored primarily in the file table zone. Creating the file table zone may also automatically define the primal zone. The primal zone may be located at the starting point of a volume of the disk extending adjacent to a file table zone starting point. Formatting operations may also include destructive operations at the volume or disk level. For example, an operation may wipe out a partition table on a disk, leaving the disk completely raw. Any variations or combinations of other types of destructive operations of the formatting component 218 are contemplated within the scope of the present invention.

The unformatting component 220 may be configured to facilitate an unformatting phase. The unformatting phase includes performing unformatting operations that comprise copying primal data from the backup zone to the primal zone, copying the file table data from the backup zone to at least the file table zone and unformatting the disk to a preformat configuration. Unformatting the disk may comprise identifying the backup zone at the physical hardcoded location. The backup zone comprises the primal data occupying a first portion of the backup zone and the file table data occupying a second portion of the backup zone. The unformatting component 220 may copy the primal data from the backup zone to a primal zone of the volume. The primal zone may be located at a starting point of the volume extending adjacent to a file table zone starting point. The unformatting component 220 may also copy the file table data from the backup zone to at least file table zone on the disk and other locations on the volume where the file table data may have been located. The mapping information included in the file table data may be used to identify the locations of fragments of the file table data.

Upon copying the data from the backup zone, the unformatting component 220 may put the disk in a preformat configuration. The preformat configuration comprises a restored copy of the primal data in the primal zone and a restored copy of the file table data in at least the file table zone and potentially at other locations of the volume. A backed up copy of the primal data and the file table data may still be found in the backup zone after restoring the disk to the preformat configuration. In embodiments, the disk is un-mounted and then mounted to be properly recognized by the file system. It is contemplated that un-mounting and mounting the disk may include configuration of additional files that support an operating system of the disk.

It is further contemplated that the unformatting component 220 may perform some unformatting checking prior to unformatting the disk. An unformat check may be performed, and when a condition is not verified, the backup may be failed or other recourse action performed. Some of the unformatting checks may be similar to the preformatting checks. For example, an unformat operation may be failed based on not satisfying one or more of the following: the volume does not contain the backup zone (e.g., 900 GB-904 GB), the volume does not start at the expected starting point (e.g., 1 MB or 129 MB), the file table (e.g., $MFT) does not start at the expected location (e.g., 3 GB), backup header is present at the predetermined location (e.g., 900 GB) and the correct version but malformed. Additional unformat checks may include failing the unformat if: the backup header is not present at the predetermined location (e.g., 900 GB), is an unrecognized version, or is malformed; the volume has more than a threshold number of file records (e.g., 256 file records) or has less than a threshold capacity of free space (e.g., 99% free); and the original sector size, volume size, or starting volume offset on the disk are different between the backed up volume and the current volume. Any other variations and combinations of other types of unformat checks are contemplated within the scope of the present invention. Manual overrides are provided at the API level should an unforeseen unique situation arise requiring an unformat to proceed in a situation that is normally blocked.

A safeguard component 222 may generally ensure that if an erroneous format or other destructive operation is attempted on a disk, the operation is blocked. In particular, the safeguard component may protect volumes that have been through a preparation phase, and thus are supposed to be backed up in a preformat phase, from being formatted without a preformat backup being taken. The preformat phase may be configured as an opt-in feature and the safeguard component 222 defends against performing destructive operations on an opt-in disk without first creating a backup. As such, the safeguard component may be configured to verify that if a volume has gone through the preparation phase, then the volume should also go through a preformat phase before a format phase. In operation, by way of example, the safeguard component 222 may intercept attempts by software paths, in a cloud computing distributed system for example, to perform destructive format-type operations. The safeguard component may block the destructive operations if a preformat operation has not been completed but the preparation operation has previously been executed. In this regard, if a format request is in error, but the volume successfully went through the preformat component the system is configured to recover from the format using the backup.

A critical feature of the safeguard component 222 comprises ensuring that the preformat component 216 was invoked before the format component 218 if a preparation component 214 executed on a volume, i.e., if the backup file exists. A safeguard condition may refer to a safety check that helps affirm this critical feature of the safeguard component. As such, a plurality of safety checks may be defined around implementing this critical feature. The checks would have to be verified before a disk may be formatted. For example, a check may confirm that a new volume is at the same disk offset as the old volume before the old volume is formatted. Any other variations and combinations of safety conditions or checks for ensuring unformattable disks are contemplated within the scope of embodiments of the present invention.

Figure 3:
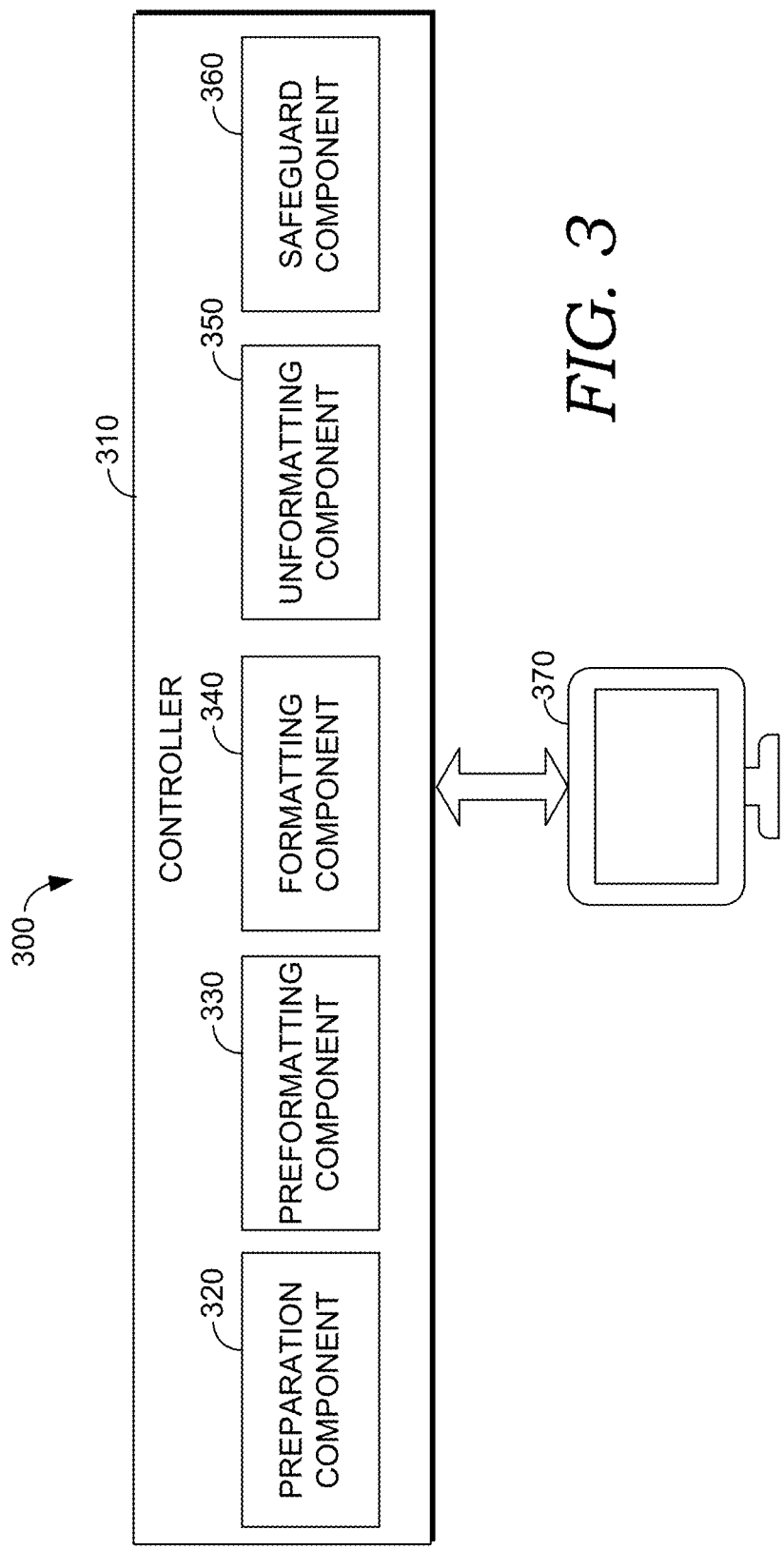
FIG. 3 is a block diagram of an exemplary computing environment for performing a method for in-place unformatting disks, in accordance with embodiments of the present invention.

With reference to FIGS. 3-7, the block diagram of FIG. 3 illustrates a computing environment 300 suitable for performing a method of in-place unformatting of disks in accordance with embodiments of the present invention. The computing environment 300 includes a controller 310, preparation component 320, preformatting component 330, formatting component 340, unformatting component 350, safeguard component 360, and computing device 370. Computing device 370 may include any type of computing device, such as the computing device 100 described with reference to FIG. 1, for example. A plurality of computing devices may be associated with the computing environment 300. It is contemplated that the computing device 370 may be used to provide a user interface for facilitating performing techniques of the present invention described herein. For example, a command line interface or graphical user interface may be used to communicate with the controller 310 and other components for in-place unformatting of disks. The computing device 370 may further be used to request formatting operations and unformatting operations. Any and all such variations and combinations of computing device features are contemplated within the scope of embodiments of the present invention.

Turning to FIGS. 4A, 4B, and 4C, FIG. 4A illustrates an exemplary disk 400 according to embodiments of the present invention. Disk 410A may be configured with a primal zone 420 and a file table zone 430. The primal zone 420 may begin at a predefined start of the volume 422 (e.g., 1 MB, 129 MB) extending adjacent to the start of the file table 432. Similarly, the starting location of the file table 432 may be predefined for a particular location on the volume (e.g., 3 GB) forming the file table zone 430. It is contemplated that parameters for the starting location of the volume 422 and starting location of the file table 432 are defined for consistency and predictability, for example, in a cloud computing distributed system; however, other types of one-off implementations with different parameters are contemplated within the scope of the present invention. The primal zone 420 may include non-file table data (e.g., user files) but it may also include some file table data (e.g., metadata). The file table zone 430 includes file table data, and as discussed, the file table data may extend beyond the file table zone 430. Additional storage zones 440 may include mostly non-file table data, but also some file table data. Zone 450 represents free space or portions on the disk without any data. Illustrated representations of data in the figures are merely exemplary and not meant to restrict or limit embodiments of the present invention.

With reference to FIG. 4B, FIG. 4B illustrates an exemplary graphical user interface (GUI) for performing a method of in-place unformatting disks. The GUI may include an enumeration of a plurality of disks. The disk may be associated with a cloud computing distributed system. A selected disk (e.g., disk 0 410B) may be presented graphically thus illustrating features of the present invention. Disk 0 410B may be selected such that a graphical representation of the disk illustrates the exemplary disk undergoing aspects of the preformatting operation. The disk 410B may be provided with graphical representations of the capacity, volume, session status, file system, free space and percentage of free space. Any other variations and combinations of graphical representations of information associated with a disk are contemplated within the scope of the present invention. A disk may be selected via the GUI to identify the disk as a target for a selected operation. It is contemplated that requests for operations on a selected disk may be communicated via the GUI to a controller in the cloud computing distributed system. Other types of interfaces are contemplated within the scope of the present invention for facilitating operations for in-place unformatting.

With continued reference to FIG. 4B, the graphical representation of the disk illustrates a backup zone 460. The backup zone 460 may be configured to include a predetermined starting point 462 of the backup zone. The predetermined starting location may be advantageously at a physical hardcoded location on the disk. The backup zone 460 may be configured to correspond in size to the combination of the primal zone 420 and the file table zone 430. By way of example, the file table zone 420 is defined as 1 GB, starting at the 3 GB location on the disk, making the primal zone 420 3 GB. The capacity totals at 4 GB. In this regard, the physical hardcoded location may be defined as starting at 900 GB through 904 GB. The backup zone extends from 900 GB to 904 BG for a capacity of 4 GB. As previously discussed 900 GB is selected based on a nominal capacity of a disk configured on the cloud computing distributed system. In embodiments, within the backup zone 460 a starting point for a copy of the file table data may be defined as starting point 464. The starting point may begin adjacent to the 3 GB mark within the backup zone. By way of example, a 4 GB backup zone defines a first portion extending from 462 to adjacent 464, the first portion having a capacity of 3 GB for the copy of the primal data and a second portion extending from 464 to the end of the backup zone 460, the second portion having a capacity of 1 GB.

With reference to FIG. 4C, a backup file 470 may be created and stored on the disk. The backup file 470 serves as a space-holder for storage needed for the primal data and file table data. The backup file 470 may be created having a size that matches the anticipated capacity of the primal data and the file table data. In the alternative, the backup file 470 may be created with double the allocation, so that, portions of the backup reserve in advance free clusters for vacating files out of the backup zone 460. Vacating files out of the backup zone allows for positioning the backup file 470 in the backup zone 460. The preformatting component 330 may utilize the backup file 470 to occupy the predetermined location on the disk that defines backup zone 460.

Turning to FIGS. 5A and 5B, FIG. 5A illustrates primal data 524 and file table data 534. As best shown in FIG. 5B, upon configuring the backup file 470 to occupy the backup zone 460, the preformatting component 330 may copy the primal data 524 from the primal zone 420 to the backup zone 460. The preformatting component 330 may also copy file table data 534 from at least the file table zone 434 to the backup zone 460. It is contemplated that additional fragments of the file table data may be located at different locations of the volume; the additional fragments are also consolidated in the backup zone 460. As shown, the backup copies may be illustrated as primal data 524*a* and file table data 534*a*.

The formatting component 340 may format the disk from a preformat configuration 510B in FIG. 5B to a post-format configuration 610 in FIG. 6. The post-format configuration 610 is such that the disk may be recovered from the post-format configuration 610 to the pre-format configuration 510B using the primal data 524*a* and the file table data 534*a* in the backup zone. As best shown in FIG. 6, formatting may include creating a new file table 634 and some secondary file system metadata in 420 file while not overwriting the vast majority of user data on the disk. The formatting process marks the previous data as free space without erasing the data. In this regard, the post-format configuration 610 includes the primal data 524*a* and the file table data 534*a* on the disk in the backup zone 460, but marked as free space. It is noteworthy that the first portion of the volume that equals the size of the primal data 420 (e.g., 3G) may be overwritten without issue, as it is stored in the backup zone 460. Any portion of the volume overwritten beyond the primal zone may begin to overwrite previously recoverable data.

With reference to FIG. 7, unformatting disk 710 includes the unformatting component 340 copying the primal data 524*a* from the backup zone 460 of the disk to the primal zone 420 of the disk. The unformatting component 330 may then copy the file table data 534*a* from the backup zone 460 to at least the file table zone 430. Copying the file table data 534*a* from the backup zone 460 may include overwriting the new file table data 634 in the file table zone 430. The disk is then unformatted to a preformat configuration.

Turning now to FIG. 8 a flow diagram is provided that illustrates a method for formatting disks for in-place unformatting. At block 810, a backup file is used to occupy a predetermined location that defines a backup zone on a disk. The backup file is stored in the backup zone. At block 820, primal data is copied from a primal zone to the backup zone. At block 830, file table data is copied to the backup zone. At block 840, the disk having the primal data and the file table data in the backup zone is formatted. The format operation formats the disk from a preformat configuration to a post-format configuration. The post-format configuration is such that the disk may be recovered from the post-format configuration to the pre-format configuration using the primal data and the file table data in the backup zone.

Turning now to FIG. 9, a flow diagram is provided that illustrates a method for in-place unformatting disks. At block 910, primal data is copied from a backup zone of a disk to a primal zone of the disk. The primal data occupies a first portion of a predetermined location that defines the backup zone on the disk. At block 920, all available file table data is copied to its original location(s) on disk, starting with the file table zone. The file table data occupies a second portion of the predetermined location; the predetermined location configured using a backup file. At block 930, the disk is unformatted to a preformat configuration.

Turning now to FIG. 10, a flow diagram is provided that illustrates a method for safeguarding disks from accidental formatting and unformatting operations. At block 1010, a request for a destructive disk operation such as format is intercepted. At block 1020, a safeguard condition of the disk operation is verified. At block 1030, when the safeguard condition is satisfied, the method proceeds with request. At block 1040, when the safeguard condition is not satisfied, the request is redirected. The request may be redirected based on a plurality of predefined safety procedures described herein for embodiments of the present invention.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A distributed system comprising:
a preparation component configured for:
creating a backup file on a disk;
a preformatting component configured for:
using the backup file to occupy a predetermined location that defines a backup zone on the disk, wherein the backup file is stored in the backup zone,
wherein the backup zone includes a first portion of the backup file in a first portion of the backup zone as a space-holder for backing up primal data, and
wherein the backup zone includes a second portion of the backup file in a second portion of the backup zone as a space-holder for backing up file table data;
copying primal data from a primal zone to the first portion of the backup zone;
overwriting the first portion of the backup file in the first portion of the backup zone, wherein overwriting the first portion of the backup file backs up metadata files in the first portion of the backup zone, wherein the primal data comprises metadata;
copying file table data to the second portion of the backup zone; and
overwriting the second portion of the backup file in the second portion of the backup zone, wherein overwriting the second portion of the backup file backs up a file system structure in the in the second portion of the backup zone, wherein the file table data comprises the file system structure; and
a formatting component configured for:
formatting the disk having the primal data and the file table data in the backup zone;
an unformatting component configured for:
copying the primal data from the backup zone to the primal zone;
copying the file table data to at least a file table zone; and
unformatting the disk to a preformat configuration.

2. The distributed system of claim 1, further comprising:
a controller component configured for:
enumerating a plurality of disks in the distributed system; and
receiving a request to perform one or more operations on a selected disk, the one or more operations comprising:
a preparation operation;
a preformatting operation;
a formatting operation; and
an unformatting operation.

3. The distributed system of claim 2, further comprising:
the preparation component configured for:
creating the backup file at a physical hardcoded location on the disk, wherein the physical hardcoded location on the disk is relative to a starting location of the disk not the volume of the disk.

4. The distributed system of claim 3, wherein the backup file is created in a root directory of the volume.

5. The distributed system of claim 3, wherein the physical hardcoded location is located proximate a nominal capacity of a disk configuration in the distributed system.

6. The distributed system of claim 1, wherein the preformatting component is further configured for:
creating free clusters based on truncating the backup file from a first size to a second size; and
defragmenting data from backup zone to position the backups file that is truncated, contiguously on the disk in the backup zone.

7. The distributed system of claim 1, wherein the preformatting component is further configured for:
positioning at least a portion of the backup file contiguously on the disk in the backup zone.

8. The distributed system of claim 1, further comprising a safeguard component configured for:
intercepting a request for a destructive disk operation;
verifying whether a safeguard condition of the disk operation is satisfied;
proceeding with the request when the safeguard condition is satisfied; and
redirecting the request when the safeguard condition is not satisfied.

9. One or more computer storage media having computer-executable instructions embodied thereon that, when executed, cause a computing device to perform a method for formatting disks for in-place unformatting, the method comprising:
creating a backup file to occupy a predetermined location that defines a backup zone on the disk, wherein the backup file is stored in the backup zone,
wherein the backup zone includes a first portion of the backup file in a first portion of the backup zone as a space-holder for backing up primal data, and
wherein the backup zone includes a second portion of the backup file in a second portion of the backup zone as a space-holder for backing up file table data;
copying primal data from a primal zone to the first portion of the backup zone, overwriting the first portion of the backup file in the first portion of the backup zone;
copying file table data to the second portion of the backup zone, overwriting the second portion of the backup file in the second portion of the backup zone; and
formatting the disk storing the primal data and the file table data.

10. The method of claim 9, wherein the predetermined location is a physical hardcoded location on the disk, wherein the physical hardcoded location is relative to a starting location of the disk not the volume.

11. The method of claim 10, wherein using the backup file to occupy the predetermined location that defines the backup zone further comprises:
positioning at least a portion the backup file contiguously on the disk in the backup zone.

12. The method of claim 10, wherein using the backup file to occupy the predetermined location that defines the backup zone further comprises:
creating free clusters based on truncating the backup file from a first size to a second size; and
defragmenting data from backup zone to position the backups file that is truncated, contiguously on the disk in the backup zone.

13. The method of claim 12, wherein truncating the backup file is based on a determination that free clusters are needed in the backup zone.

14. The method of claim 13, wherein the backup file truncated size is less than the backup file original size.

15. The method of claim 10, wherein the primal data and file table data are associated with corresponding predetermined locations and sizes in the backup zone.

16. The method of claim 9, wherein the primal zone is located relative to a starting point of a volume of the disk extending adjacent to a file table zone starting point.

17. The method of claim 9, wherein the primal data comprises file table data and non-file table data file.

18. A computer-implemented method for in-place unformatting disks, suitable for use in a distributed computing environment utilizing a processor and a memory, the method comprising:

copying primal data from a first portion of a backup zone of a disk to a primal zone of the disk, the primal data occupying a first portion of a predetermined location that defines the backup zone on the disk, wherein the backup zone is a store for a first portion of a backup file in the first portion of the backup zone as a space-holder for backing up primal data;

copying file table data from a second portion of the backup zone to at least a file table zone, the file table data occupying a second portion of the predetermined location, the predetermined location configured using a backup file, wherein the backup zone is a store for a second portion of the backup file in a second portion of the backup zone as a space-holder for backing up file table data; and unformatting the disk to a preformat configuration.

19. The computer-implemented method of claim 18, copying the file table data further comprises using mapping information for the file table data to store the file table to their previous locations on the volume.

20. The computer-implemented method of claim 18, copying the file table data from the backup zone to the file table zone further comprises overwriting at least portion of a post-format file table data in the file table zone.

* * * * *